United States Patent
Han et al.

(12) 
(10) Patent No.: US 6,780,207 B1
(45) Date of Patent: Aug. 24, 2004

(54) METHOD FOR MANUFACTURING A LITHIUM POLYMER SECONDARY BATTERY

(75) Inventors: Seung Woo Han, Seoul (KR); Young Jae Kim, Choongju-si (KR); Joo Hak Lee, Choongju-si (KR); Jong Cheon Kim, Choongju-si (KR); Suk Ho Jin, Choongju-si (KR); Kab Youl Lee, Pusan (KR)

(73) Assignee: Saehan Enertech Incorporation, Seoul (KR)

( * ) Notice: Subject to any disclaimer, the term of this patent is extended or adjusted under 35 U.S.C. 154(b) by 16 days.

(21) Appl. No.: 10/341,337

(22) Filed: Jan. 13, 2003

(51) Int. Cl.$^7$ .............................................. H01M 10/38
(52) U.S. Cl. .................................... 29/623.3; 29/623.1
(58) Field of Search .............................. 29/623.3, 623.1

(56) References Cited

U.S. PATENT DOCUMENTS 4,048,397 A * 9/1977 Rothbauer ............. 29/623.1 X
5,618,318 A * 4/1997 Reddy et al. ............... 29/623.1
6,051,038 A * 4/2000 Howard et al. ............. 29/623.1
6,120,563 A * 9/2000 Kraft et al. ................. 29/623.1
6,468,693 B1 * 10/2002 Takami et al. .............. 429/176

* cited by examiner

*Primary Examiner*—John S. Maples
(74) *Attorney, Agent, or Firm*—Harrison & Egbert

(57) ABSTRACT

A method for manufacturing a lithium polymer secondary battery including cells each having an anode, a cathode, and an isolation film, which is capable of minimizing the gap between each electrode and the isolation film, and uniformly distributing stress over the entire surface of each electrode. This method involves preparing anode plates having a desired size, cathode plates having a desired size, and an isolation film having a desired size; wrapping one of the anode plates by the isolation film, wrapping one of the cathode plates by the isolation film; wherein it is overlapped with the anode plate, thereby forming one of the cells, and stacking remaining plates at both sides of the formed cell while rotating the formed cell, and simultaneously wrapping by the isolation film so that they are alternately arranged in a state in which the isolation film is tensioned by a desired tension.

2 Claims, 3 Drawing Sheets

METHOD FOR MANUFACTURING A LITHIUM POLYMER SECONDARY BATTERY

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to the manufacture lithium polymer secondary batteries, and more particularly to a method for manufacturing a lithium polymer secondary battery by wrapping anode and cathode plates by an isolation film while rotating a cell initially formed during an assembling process in a state in which the isolation film is tensioned by a desired tension.

BACKGROUND OF THE INVENTION

Recently, portable appliances such as notebook PCs and cellular phones have been widely distributed. Such a wide distribution of portable appliances has resulted a greatly increased demand for rechargeable secondary batteries of a high capacity and a high performance. A rechargeable lithium ion secondary battery has been proposed which includes a cathode made using, as an active substance, a carbonic material capable of occluding and releasing lithium ions, an anode made of lithium based mixed oxides capable of performing charging and discharging of lithium ions in accordance with a structural deformation thereof, and a nonaqueous electrolyte serving as a medium for lithium ions. This lithium ion secondary battery is being widely used. However, this ion battery has problems associated with stability in that it exhibits a high reactivity with moisture, and uses an excessive amount of thermally unstable electrolyte. Furthermore, it requires use of a metal can as its battery package. For this reason, there is a degradation in energy density, and a limitation on battery shape.

In order to eliminate such problems or drawbacks, a lithium polymer secondary battery using polymer electrolyte has been proposed. This lithium polymer secondary battery exhibits reduced leakage of electrolyte while allowing free design of the battery's shape. Also, there are advantages of a miniature, light, and thin structure, and a superior stability. Examples of such a lithium polymer secondary battery are disclosed in U.S. Pat. No. 6,468,693, and other patents.

FIG. 1 illustrates a method for manufacturing a lithium polymer secondary battery, using a winding process. This method is also adopted in U.S. Pat. No. 6,468,693. The lithium polymer secondary battery according to this patent is of a jelly roll type. That is, the lithium polymer secondary battery has a structure in which a jelly roll is inserted into a can which is, in turn, capped and then sealed in accordance with a laser fusion process. The cathode and anode of this lithium polymer secondary battery are fabricated by coating a polymer binder, conductive powder, and an active electrode material on both surfaces of a copper thin plate and an aluminum thin plate, respectively. In order to achieve an attachment of electrode taps, the cathode and anode have non-coated portions. The non-coated portions of the cathode and anode are electrode taps made of nickel and aluminum materials, respectively. The two electrodes are connected to external terminals of the battery via the electrode taps, respectively. One of the electrode taps attached to the non-coated electrode portions is attached to the bottom or side surface of the can when the jelly roll is inserted into the can, whereas the other tap is attached to the cap. Such an assembling method and structure provides certain advantages. That is, the anode and cathode are in uniform contact with each other by virtue of a tension applied to an isolation film during a winding process while being physically pressed against the wall of the can. Accordingly, when the battery performs a charging or discharging operation in accordance with an electrochemical reaction, the entire electrode surface is uniformly used. Thus, the battery basically has a superior performance while exhibiting a high performance even for lengthy charge and discharge cycles. There is another advantage given by virtue of the wall of the cell being made of a metal material having a high mechanical strength. That is, the jelly roll is filled in the interior of the can in a strongly pressed state in accordance with the physical pressing force present between the jelly roll and the can wall. It is also possible to minimize the deformation of the can in a thickness direction caused by an internal deformation force generated from the jelly roll. Thus, the density of energy per unit volume of the finally manufactured battery can be increased. In addition, it is possible to prevent the material contained in the battery from being outwardly leaked, and to prevent external foreign matters from penetrating into the interior of the battery.

However, the lithium polymer secondary cell manufactured using the winding process has a wound shape which does not correspond to a perfectly planar shape, but corresponds to a deformed oval shape. For this reason, it is impossible to fit the jelly roll in the battery without formation of gaps. Accordingly, there is a difference between the stress concentrated on the edge of the cell and the stress concentrated on the central portion of the cell. As a result, there is a problem in that the life of the battery is reduced.

On the other hand, U.S. Pat. No. 4,048,397 discloses a zig-zag stacking method in which a plurality of electrodes are stacked within a certain area. The cell manufactured in accordance with this method has a planar stacked structure, so that there is no cause for any stress difference. In accordance with this method, however, a gap between each electrode plate and the isolation film is inevitably formed during the stacking process, as shown in FIG. 2. Due to such a gap formed between each electrode plate and the isolation film, the battery may be swelled up at its edge after prolonged charging and discharging operations, so that the life of the battery is reduced.

BRIEF SUMMARY OF THE INVENTION

Therefore, the present invention has been made in view of the problems involved with the above mentioned winding method and zig-zag stacking method, and an object of the invention is to provide a method for manufacturing a lithium polymer secondary battery, which is capable of minimizing the gap between each electrode and an isolation film, and uniformly distributing stress over the entire surface of each electrode, thereby extending the life of the rechargeable battery.

In accordance with the present invention, this object is accomplished by providing a method for manufacturing a lithium polymer secondary battery including a plurality of cells each including an anode plate, a cathode plate, and an isolation film adapted to insulate the plates from each other, comprising the steps of: preparing a plurality of anode plates each having a desired size, a plurality of cathode plates each having a desired size, and an isolation film having a desired size for the cells; wrapping one of the anode plates by the isolation film; wrapping one of the cathode plates by the isolation film in a state in which it is overlapped with the anode plate, thereby forming one of the cells; and stacking the remaining anode plates and cathode plates at both sides of the formed cell while rotating the formed cell, and simultaneously wrapping them by the isolation film so that t-hey are alternately arranged in a state in which the isolation film is tensioned by a desired tension.

BRIEF DESCRIPTION OF THE SEVERAL VIEWS OF THE DRAWINGS

The above objects, and other features and advantages of the present invention will become more apparent after a reading of the following detailed description when taken in conjunction with the drawings.

DETAILED DESCRIPTION OF THE INVENTION

Figure 3:
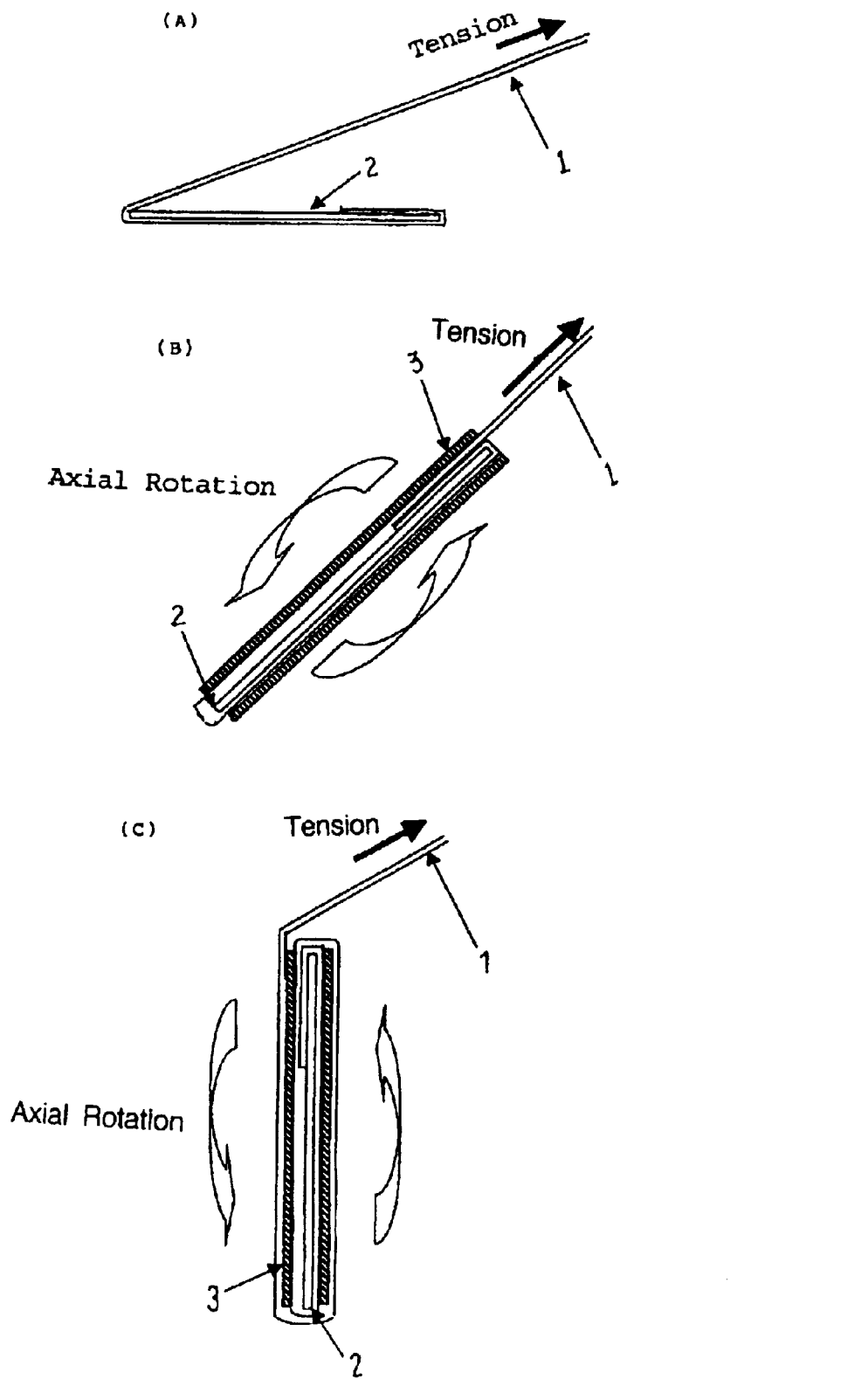
FIGS. 3A to 3C are schematic views illustrating a method for manufacturing a lithium polymer it secondary battery in accordance with the present invention.
Figure 4:
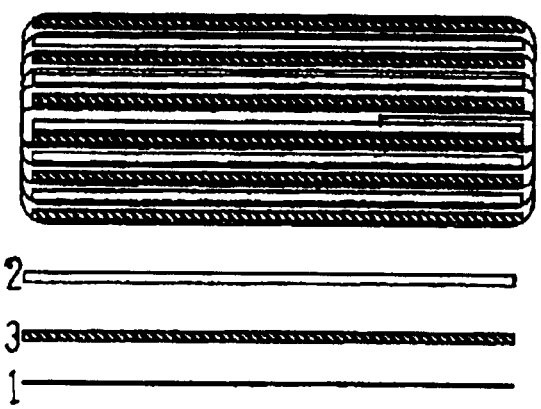
FIG. 4 is a schematic view illustrating the lithium polymer secondary battery manufactured in accordance with the present invention.

Referring to FIGS. 3A to 3C, a method for manufacturing a lithium polymer secondary battery in accordance with the present invention is illustrated. As shown in FIGS. 3A to 3C, the lithium polymer secondary battery includes cells each including an anode plate 2 coated with a dried active anode material, a cathode plate 3 coated with a dried active cathode material, and an isolation film 1 made of polyolefin, and adapted to insulate the electrode plates 2 and 3. In accordance with the method of the present invention, a first cell is formed by wrapping one anode plate 2 by the isolation film 1, and then wrapping one cathode plate 3 by the isolation film 1 in such a fashion that the cathode plate 3 is overlapped with the anode plate 2, as shown in FIG. 3A. Thereafter, the cells of the lithium polymer secondary battery are stacked at both sides of the cell while being wrapped by the isolation film 1 tensioned by a desired tension. This procedure is carried out while rotating the first cell. This procedure is best shown in FIGS. 3B and 3C. A complete structure of such a lithium polymer secondary battery is shown in FIG. 4.

The tension of the isolation film 1 is preferably within a range of 0. 3 to 5 kgf/cm². Problems associated with workability occur when the tension of the isolation film 1 is less than 0.3 kgf/cm² or more than 5 kgf/cm².

Now, the present invention will be described in more detail with reference to an example and comparative examples.

EXAMPLE 1

The lithium polymer secondary battery applied to this example has a standard corresponding a 1.3 Ah grade. The anode plate 2 in each cell of the lithium polymer secondary battery was made by coating $LiCoO_2$, in the form of a thin film, over an aluminum foil. The cathode plate 3 was made by coating graphite, in the form of a thin film, over a copper foil. The anode plate 2 had a longitudinal dimension of 46 mm, and a lateral dimension of 50.4 mm, the cathode plate 3 had a longitudinal dimension of 46.6 mm, and a lateral dimension of 52 mm, and the isolation film 1 had a width of 53.5 mm. The anode and cathode plates 2 and 3 were prepared by a punching process. The isolation film 1 was first wrapped around one anode plate 2 , as shown in FIG. 3A. Thereafter, one cathode plate 3 was wrapped by the isolation film 1 in a state in which it is overlapped with the anode plate 2. The wrapping of the isolation film 1 was carried out under the condition in which a certain tension is applied to the isolation film 1. Thus, one cell is formed. The remaining cells were formed by stacking the remaining anode plates 2 and cathode plates 3 at both sides of the cell while rotating the cell, and simultaneously wrapping them by the isolation film 1 so that they were alternately arranged in a state in which the isolation film 1 is uniformly tensioned by a 1.5 kgf/cm². Thereafter, the resultant assembly was inserted into an aluminum pouch, and then sealed at all surfaces except for one surface. 4.7 g of 1M $LiPF_6$/EC:PC:EMC (30:10:60) was supplied into the assembly through the unsealed surface. Subsequently, the assembly was completely sealed under vacuum. Finally, the electrodes were sufficiently dipped into an electrolyte.

COMPARATIVE EXAMPLE 1

Figure 1:
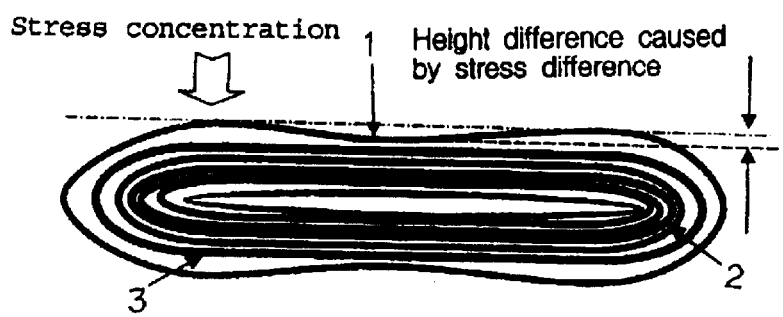
FIG. 1 is a schematic view illustrating a method for manufacturing a lithium polymer secondary battery, using a winding process.

The same procedure as Example 1 was carried out, except that the assembling of anode and cathode plates was carried out using a winding method as shown in FIG. 1.

COMPARATIVE EXAMPLE 2

Figure 2:
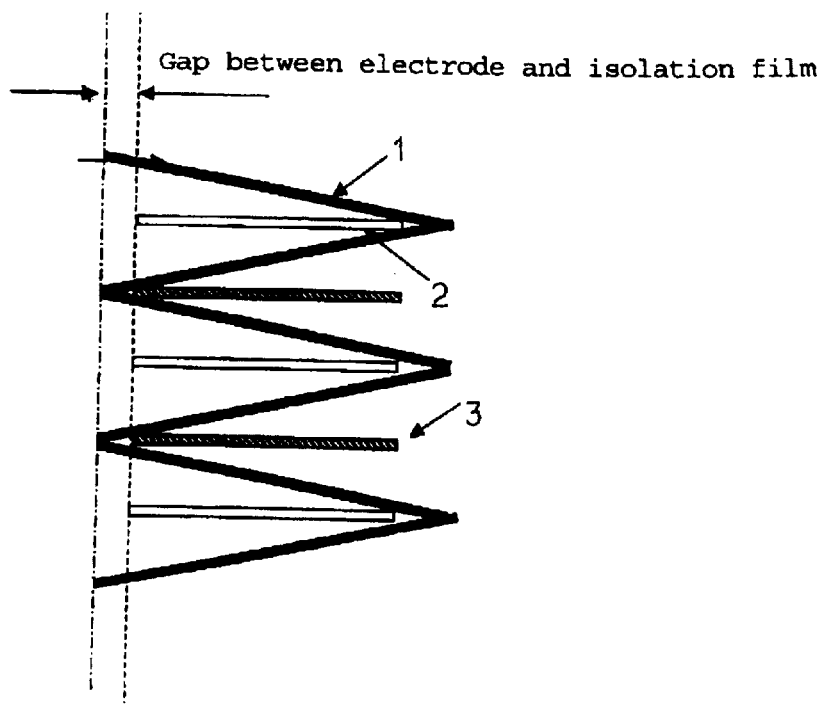
FIG. 2 is a schematic view illustrating a method for manufacturing a lithium polymer secondary battery, using a zig-zag stacking method.

The same procedure as Example 1 was carried out, except that the assembling of anode and cathode plates was carried out using a zig-zag stacking method as shown in FIG. 2.

The batteries manufactured in Example 1 and COMPARATIVE Examples 1 and 2 were charged, and then subjected to an evaluation of battery life.
Charging and Discharging Methods and Evaluation of Battery Life For each of the batteries manufactured in accordance with Example 1 and Comparative Examples 1 and 2, an initial charging operation was carried out in two steps, that is, primarily up to 3.15 V at 0.2 C, and secondarily up to 4.2 V at 0. 2 C. After being subjected to a stabilizing procedure, each battery was charged with a constant voltage and constant current up to 4.2 V at 1 C. Thereafter, a discharging operation was carried out to 3.0 V at 1 C for each battery. The evaluation for battery life was carried out at normal temperature using a charging discharging tester (TOSCAT-3100U).

As apparent from Example 1 and Comparative Examples 1 and 2, in the lithium polymer secondary battery according to the present invention, stress is uniformly applied to the entire surface of the battery. In this lithium polymer secondary battery, the gap between each electrode and the isolation film is also minimized. Accordingly, a high capacity maintenance rate for prolonged charging discharging operations is exhibited. Thus, the characteristics associated with battery life are improved.

We claim:
1. A method for manufacturing a lithium polymer secondary battery in which the battery has a plurality of cells, each of the plurality of cells having an anode plate and a cathode plate and an isolation film, the isolation film insulating the anode plate and the cathode plate from each other, the method comprising:

preparing a plurality of anode plates each having a desired size;

preparing a plurality of cathode plates each having a desired size;

preparing an isolation film having a desired size for the cells:

wrapping one of said plurality of anode plates by said isolation film such that said isolation film is placed over opposite surfaces of the anode plate under tension;

overlapping the anode plate with one of said cathode plates such that said isolation film is interposed between a surface of the cathode plate and one of the opposite surfaces of the anode plate;

wrapping said isolation film under tension over an opposite surface of the of the plurality of cells; and stacking the remaining anode plates of said plurality of anode plates and the remaining cathode plates of said plurality of cathodes plates alternately on opposite sides of the formed cell while rotating the formed cell; and wrapping said isolation film under tension over and around the remaining anode plates and the remaining cathode plates during the step of stacking such that said isolation film is interposed between adjacent pairs of cathode plates and anode plates.

2. The method of claim 1, said isolation film being under a tension of between 0.3 and 5.0 kgF/mc$^2$.

* * * * *